United States Patent Office 3,700,502
Patented Oct. 24, 1972

3,700,502
HIGH ENERGY DENSITY BATTERY
Nobuatsu Watanabe, Kyoto, and Masataro Fukoda, Osaka, Japan, assignors to Matsushita Electric Industrial Co., Ltd., Osaka, Japan
Continuation of abandoned application Ser. No. 814,015, Apr. 7, 1969. This application Apr. 21, 1971, Ser. No. 136,247
Claims priority, application Japan, Apr. 17, 1968, 43/26,218
Int. Cl. H01m 17/00
U.S. Cl. 136—6
6 Claims

ABSTRACT OF THE DISCLOSURE

A battery of high energy density which is composed of a negative electrode consisting mainly of a light metal, a non-aqueous electrolyte and a positive electrode having a solid fluorinated carbon as active material, said solid fluorinated carbon being obtained by the fluorination of an amorphous carbon, such as charcoal, active carbon or coke; and which has such advantages that the utility of the positive electrode active material is high, that the flat characteristic of discharge voltage is excellent, that the shelf life is long due to the chemical stability in the electrolyte of the fluorinated carbon used as active material, and that the cost is low.

---

Figure 1:
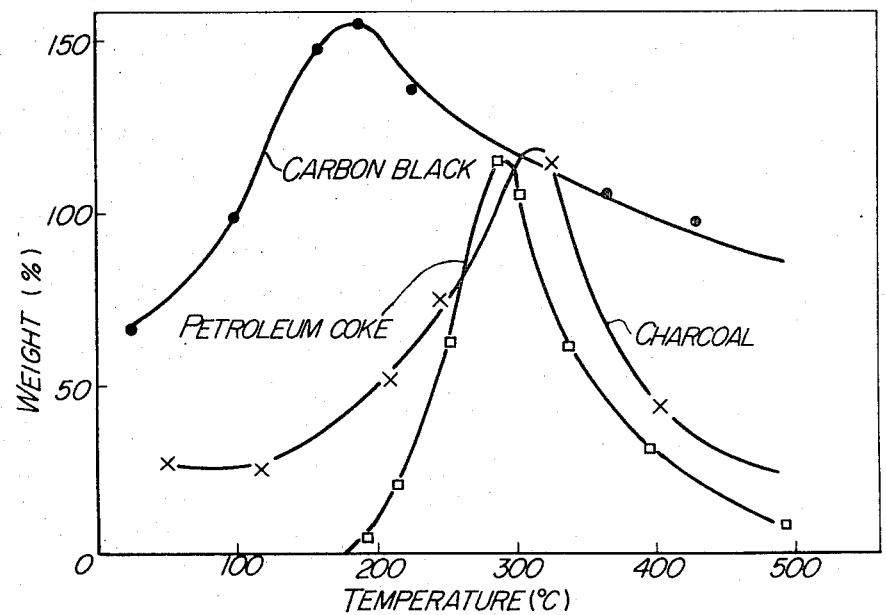

This application is a streamlined continuation of U.S. patent application Ser. No. 814,015, filed Apr. 7, 1969, abandoned upon the filing of this application.

The present invention relates to improvements in a battery of the type comprising a negative electrode having an active material which consists mainly of a light metal of large electrical negativity, such as lithium, sodium or aluminum, and a non-aqueous electrolyte, such as organic electrolyte, which does not dissolve the negative electrode.

What is particularly important to note is that the object of the present invention is to provide a battery of high energy density which has not been obtainable hitherto, by the use of a solid fluorinated carbon as a novel active material for positive electrode, said solid fluorinated carbon being represented by the formula $(CF_x)_n$ wherein $x$ is larger than 0 but not larger than 1 and composed of carbon and fluoride, said carbon consisting mainly of an amorphous carbon, such as coke, charcoal or active carbon.

More specifically, the present invention provides a battery system including a fluorinated carbon, which, as apparent from the comparison shown in Table 1, is outstandingly superior to the conventional battery systems using halides of nickel, copper, etc. which heretofore been believed to be the active materials with the highest energy density theoretically as well as practically, as the positive electrode and lithium as the negative electrode.

TABLE 1

| | Ah./kg. | $E_0$ | Wh./kg. |
|---|---|---|---|
| $nLi+(CF)_n \rightarrow nLiF+nC$ | 864 | (3.50) | (3,000) |
| $2Li+CuF_2 \rightarrow 2LiF+Cu$ | 436 | 3.53 | 1,640 |
| $2Li+NiF_2 \rightarrow 2LiF+Ni$ | 485 | 2.83 | 1,365 |
| $2Li+CuCl_2 \rightarrow 2LiCl+Cu$ | 362 | 3.08 | 1,111 |
| $2Li+NiCl_2 \rightarrow 2LiCl+Ni$ | 374 | 2.57 | 960 |

Further, a battery incorporating the solid fluorinated carbon as active material of the positive electrode, exhibits such meritorious features that the utility of the active material is high and nearly 100%, that the flat characteristic of discharge voltage is excellent and that the shelf life is long due to the fact that the fluorinated carbon is chemically stable in the electrolyte and not hydroscopic per se. Still further, since carbon is used as the starting material, instead of nickel or copper, a battery of high energy density can be provided economically advantageously.

In a battery system using a non-aqueous electrolyte, it is possible to use lithium or sodium which cannot be used with aqueous electrolyte and, therefore, it is possible to obtain a small size, light weight battery of high voltage and high energy density. Such a high energy density is the most important feature of the battery comprising non-aqueous electrolyte. In this type of battery system, therefore, selection of a positive electrode active material to be used in combination with the negative electrode consisting of lithium or sodium, is of great importance. Namely, a positive electrode active material to be used in a battery of high energy density is required to have large discharge capacity per unit weight per se, to be large in electromotive force so as to enable a high terminal voltage to be obtained from a battery in which it is used, and to be active providing for smooth discharge of the battery with little polarization and satisfactory flat characteristic of the discharge voltage during discharge of the battery. Furthermore, the active material is required not to be decomposed or dissolved in the electrolyte or is required to cause a minimum self discharge, which is obvious from the standpoint of the shelf life of the battery. The solid fluorinated carbon used in the present invention fulfills these conditions nearly completely as will be explained hereinafter.

In the past, the batteries using alkali metals, such as lithium and sodium, as negative electrode and non-aqueous electrolytes, have been studied for use for special purposes, mainly for military purposes. As active material for the positive electrodes of such batteries, fluorides and chlorides of copper, nickel, silver, etc. have mainly been examined, but none of them are entirely satisfactory and an optimum active material has not been found as yet.

Namely, copper fluoride is one of the active materials which are widely being studied because that is theoretical energy density is 0.53 ah./g. and the highest of all the active materials mentioned above and it enables a terminal voltage as high as 3.0 to 3.4 v. to be obtained when used in a battery in combination with a lithium negative electrode, but, on the other hand, it has the fatal drawback that it can normally be obtained only in the form of $CuF \cdot 2H_2O$ with crystal water because anhydrous copper fluoride $CuF_2$ is very instable. Pure $CuF_2$ cannot be obtained by the dehydration of the crystal water-containing copper fluoride because the dehydration results in formation of CuF and/or CuO or in decomposition of the copper fluoride due to its water absorbing property. Another disadvantage is that the copper fluoride dissolves in the electrolyte in a battery, whereby the performance of the battery is degraded and the utility of the active material is reduced to as low as 50–60%. Copper fluoride is particularly unsatisfactory in that the discharge capacity of a battery incorporating copper fluoride falls to below 50% of the initial value in a few days due to heavy self discharge, and further in that the copper formed from the discharge reaction deposits on the lithium negative electrode, causing shorting between the electrodes. For the foregoing reasons, a reliable battery cannot be obtained with copper fluoride as active material for the positive electrode.

A battery incorporating copper chloride as active material of the positive electrode has substantially the same defects as those mentioned above relative to copper fluoride. Besides such defects, use of copper chloride involves further problems in respect of utility of the active material and shelf life of the battery, due to the presence of chlorine ion which results from the dissolution of the copper chloride.

Nickel fluoride $NiF_2$ and nickel chloride $NiCl_2$ are also reported to be unsatisfactory because, while they have a high energy density, i.e. 0.56 ah./g. for $NiF_2$ and 0.41 ah./g. for NiCl, anhydrides thereof are instable and have water absorbing property, and further the reactivities of those compounds in the battery system are low as compared with those of the aforesaid copper compounds and they are susceptible to polarization when incorporated in a battery, wherefore the flat characteristic of discharge voltage of the battery incorporating such compounds is poor and a practical discharge performance cannot be obtained.

Silver chloride is another compound which has been examined as a stable active material. This compound, however, is not adapted for use in a battery of high energy density, except for special cases, since it is expensive and is as low as 0.19 ah./g. in energy density.

In the light of the fact that the presently proposed active materials for positive electrode are predominantly chlorides and fluorides, it is rather natural that fluorides of graphite of a structure represented by the formula $(CF_x)_n$, wherein $x$ is larger than 0 but not larger than 0.25, has been proposed recently. The details of such fluorides have not been made public but it is assumed that fluorides of the formula $(CF_x)_n$ wherein $x$ is not larger than 0.25 are being used, in consideration of easiness of production, stability and electrical conductivity of the compounds. However, the fluorides of graphite being used at present suffer from the disadvantage that the energy densities thereof are in a range as low as 0.2–0.4 ah./g., and even the fluoride of the formula $(CF_{0.25})_n$ wherein the value of $x$ in the above general formula is largest, shows an energy density of 0.4 ah./g. which is smaller than that of other active materials, e.g. 0.53 ah./g. of $CuF_2$ and 0.56 ah./g. of $NiF_2$.

The present inventors have found that solid fluorinated carbons can be obtained economically efficiently by the process, proposed previously by one of the present inventors, using amorphous carbons, other than graphite, e.g. coke, charcoal, carbon black, such as acetylene black, and active carbon, such as vegetable active carbon, and further that the carbon fluorides thus obtained are far superior to the conventional active materials in respect of flat characteristic of discharge voltage, high rate discharge characteristic and utility.

More practically, a substantially amorphous carbon, e.g. coke, can be fluorinated easier than graphite and yet fluorinated carbons of the formula $(CF_x)_n$ wherein the value of $x$ is as large as from 0.5 to 1.0 can be obtained by the fluorination. Such a substantial difference from graphite may presumably be attributed to the fact that the surface area of the carbon particle is as large as about 300 m.$^2$/g. and the particle is amorphous. Further, the fluorinated carbons, when used as active material, retain a large quantity of electrolyte because of the large surface area and high porosity and this is probably the reason why they exhibit excellent performances in respect of high rate discharge characteristic of battery and utility of active material, as compared with graphite. It is also to be noted that according to the present invention, fluorinated carbons ranging from those of small fluorine content represented by the formula $(CF_x)_n$ wherein the value of $x$ is not larger than 0.25, as have been proposed heretofore, to those of large fluorine content represented by the formula $(CF_x)_n$ wherein the value of $x$ is approximating 1, can be obtained, and either of them can be used as active material. In consideration of energy density, however, fluorinated carbons of larger $x$ value are effectively used but those of which the value of $x$ is larger than 1 are not obtainable in a solid form or are too instable to serve as active material. Therefore, fluorinated carbons of an $x$ value of 1 or close to 1 are preferably used. A positive electrode produced even using a fluorinated carbon of the formula $(CF_x)_n$ wherein the value of $x$ is 1 or close to 1, is highly stable when incorporated in a battery, and this is one of the important features of this compound. Furthermore, such a positive electrode has proved to react very actively with minimum polarization, during discharge of the battery and, therefore, to enable excellent discharge performance to be obtained.

Still another advantage of the fluorinated carbons usd in the present invention is that while in the fluorination of graphite the optimum temperature of the reaction between the graphite and fluorine is in a range from 350° to 450° C. and the reaction time is from about 2 to 5 hours, though variable depending upon the reaction temperature, the fluorination reaction for producing the fluorinated carbons used in the invention takes place at lower temperatures and is accomplished in a shorter time, although a preferable production process will be described in the example to be given later. Namely, in the production of the fluorinated carbons used in the present invention an amorphous carbon black is reactable with fluorine at temperatures ranging from room temperature to 200° C., and the other amorphous carbons, e.g. coke, acetylene black, charcoal and vegetable active carbon, are even sufficiently reactable with fluorine at temperatures in a range from 100° to 350° C. This means that the fluorinated carbons consisting primarily of amorphous carbon can be obtained at lower cost than those made from crystalline carbons, such as graphite, from the standpoint of material cost and production process. It should be noted that the above-described reaction for producing the fluorinated carbons using amorphous carbons is essentially different from the reaction between carbon and fluorine, normally carried out for the formation of low molecular weight fluorocarbons, such as gaseous $CF_4$ and $C_2F_6$.

Further, the solid fluorinated carbons used in the present invention and produced by the use of such carbons which consist primarily of amorphous carbons, are extremely stable and resistive to chemicals, over the range of a value of $x$ from approximately 0 to 1. It has also been found that the fluorinated carbons of the invention, when used as active material in a battery comprising a non-aqueous electrolyte, is not subjected to a change in composition and is not dissolved in the electrolyte, even when the electorlyte is heated sufficiently to remove therefrom water detrimental to the negative electrode. The discharge reaction of the battery system according to the present invention is represented by the reaction formula $(CF)_n + nLi \rightarrow (C)_n + nLiF$ when the value of $x$ is 1, and the excellent discharge performance is presumably explained by the quick transfer of fluorine in the solid phase and the formation of carbon as a result of the reaction which contributes to an improved conductivity of the positive electrode.

Now, the present invention will be further described by way of example. Coke was charged in a reactor made of nickel, as an amorphous carbon material, and the reactor was heated externally in an electric furnace until it reached about 380° C. while bleeding air therefrom. Thereafter, fluorine was introduced into the reactor and the reaction was carried out at about 290° C. for about 1 hour. The pressure of the fluorine atmosphere in the reactor was maintained at 0.4 atmosphere. Upon completion of the reaction, a fluorinated carbon mixture was obtained of which 80% or more was a carbon fluoride of the Formula $(CF_x)_n$ wherein $x$ is about 1, 15% was a fluorinated carbon of the same formula wherein $x$ is 1 to 0.8 and the remainder was a fluorinated carbon of the same formula wherein $x$ is 0.8 to 0.5. The type of amorphous carbon, the reaction temperature and the fluorine pressure can optionally be selected in consideration of economy.

Figure 2:
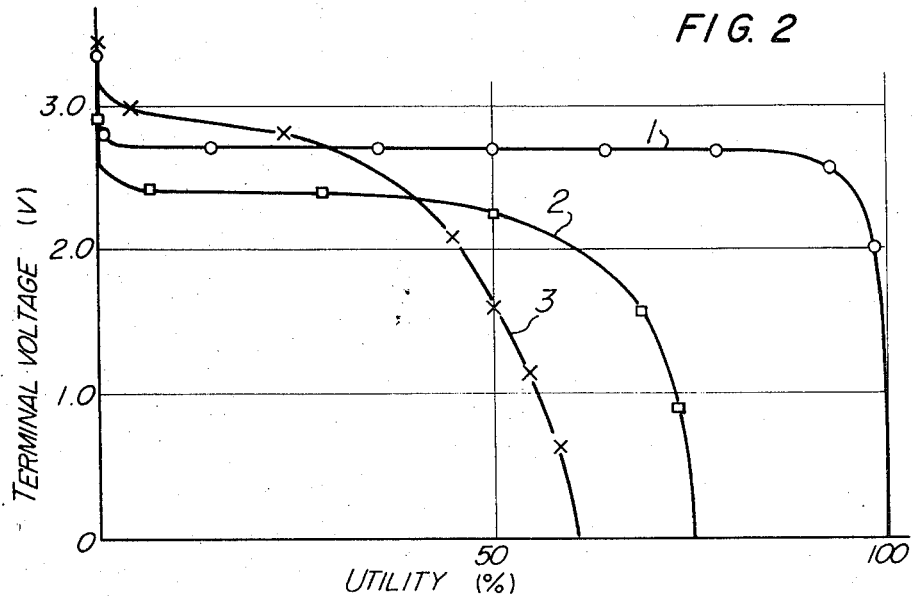

The present invention will be described in further detail with reference to the accompanying drawings, in which:

FIG. 1 is a diagram showing the relationship between the temperature and the reactivity on various carbon materials; and FIG. 2 is a diagram showing the performance of a battery of this invention in comparison with those of the conventional batteries.

Referring first to FIG. 1 there is shown the relationship between the temperature and the reactivity on various carbon materials. In case, for example, of carbon black being used as the starting material, a fluorinated carbon nearly 100% of which is of the Formula $(CF_x)_n$ wherein $x$ is 1, is produced at a reaction temperature of 190° C., at a fluorine pressure of 0.3 atmosphere and in a reaction time of 1 hour. In case of charcoal, the reaction is best carried out at about 320° C. As such, a solid fluorinated carbon of larger fluorine content can be obtained more efficiently at a lower temperature, in a shorter time and at a lower pressure of fluorine atmosphere by the use of an amorphous carbon than by the use of graphite.

The fluorinated carbon powder obtained by the process described above was mixed with an electrically conducting agent consisting of acetylene black and a binder consisting, for example, of polyethylene fluoride, in a weight ratio of 1:0.2:0.2, to form a positive electrode active material. Since this mixed powder is highly moldable, a positive electrode can be produced simply by molding the mixed powder with a nickel screen disposed centrally thereof. The electrode thus molded had a size of 40 x 40 x 1 mm. and its theoretical capacity was about 2 ah. The negative electrode used in combination with the above-described positive electrode consisted of a lithium plate which was 40 x 40 x 0.8 mm. in size and had leads connected thereto. The electrolyte used was a solution of 1 M lithium perchlorate $LiClO_4$ in one liter of propylene carbonate. A sheet of polypropylene non-woven fabric having a thickness of 0.2 mm. was used as separator. These elements were disposed in a polyethylene case and sealed therein, to obtain a battery. The assembly of the battery was effected in an argon atmosphere.

The battery thus obtained was discharged at 150 ma. to obtain a discharge characteristic represented by curve 1 in FIG. 2. Curves 2 and 3 in FIG. 2 show the discharge characteristics of batteries using AgCl and $CuF_2$ as positive electrode active materials respectively. The circuit opening voltage was 3.3 to 3.6 v. for the present battery, 2.85 v. for the battery represented by curve 2, and 3.53 v. for the battery represented by curve 3. From the diagram of FIG. 2, it will be evident that the battery according to this invention has excellent discharge characteristic. Namely, it has been revealed that the present battery is nearly 100% in the utility of active material and has excellent flat characteristic of discharge voltage. The discharge voltage of the present battery is somewhat lower than that of the battery comprising $CuF_2$, in the initial stage of discharge operation, but the present battery is superior to the latter in respect of utility of the active material and flat characteristic. Therefore, upon evaluating the characteristics of the battery as a whole, it will be understood that the active material of the present invention is superior to the conventional ones. With reference to self-discharge which is a serious problem in a battery using an organic electrolyte, the active material of this invention showed substantially no deterioration even after storage of the battery for about 6 months.

In the example described above the production process was described as a general practice but, when a solid fluorinated carbon of the invention represented by the Formula $(CF_x)_n$ wherein the value of $x$ is other than 1, is used in a battery designed for low rate discharge, blending of a metal powder or carbon powder, which is normally used as an electrically conducting ingredient, is not particularly needed, since the solid fluorinated carbon possesses the property of carbon, i.e. electrical conductivity, in a considerable degree. This is advantageous for increasing the theoretical quantity of electrolyte charged in the battery.

Further, the solid fluorinated carbons of the invention are thermally stable as mentioned before. Therefore, in producing a positive electrode it is possible to sinter the binder in the molding mixture, which is normally used for increasing the strength of the product electrode and consists of a powder of polyethylene or polyethylene tetrachloride, by heating the electrode after said electrode has been molded of said molding mixture under pressure.

Fluorides of nickel and copper normally have the water-absorbing property and even anhydrides of these compounds tend to react with water to take a form with crystal water. However, with the active materials of the present invention which do not have the water-absorbing property, a paste electrode can readily be obtained even by mixing them with an organic solvent-soluble binder, not speaking of a water-soluble binder, such as carboxymethyl cellulose, and the paste electrode thus formed can be heated to completely remove the organic solvent or water therefrom. Therefore, by the use of the active materials according to the invention, a battery can be obtained very easily which has a strong positive electrode and excellent discharge performance.

In the present invention completely amorphous carbons are used but partially amorphous carbons may also be used, such as charcoal partially graphitized at an elevated temperature. Namely, the carbons used in the invention are only required to be amorphous or substantially amorphous physically. The production conditions are variable depending upon the type of carbon used but, as has been stated previously, the fluorination is preferably carried out at temperatures ranging from room temperature to 450° C. and at a fluorine gas pressure of 1 atmosphere, more preferably at 0.2 to 0.7 atmosphere.

As will be understood from the foregoing description, the battery of the present invention exhibits excellent discharge performance which has been unobtainable with the various active materials for positive electrode which have heretofore been examined for use in a battery of the type using a light metal, e.g. an alkali metal, as negative electrode and a non-aqueous electrolyte; is economically inexpensive and, therefore, is of great industrial value.

What is claimed is:

1. A battery comprising a light metal negative electrode, a non-aqueous electrolyte, and a positive electrode having as its active material an amorphous solid fluorinated carbon represented by the Formula $(CF_x)_n$ wherein $x$ is in the range of from greater than 0 to 1.

2. A battery comprising a light metal negative electrode, said light metal being selected from the group consisting of lithium, sodium or aluminum, a non-aqueous electrolyte, and a positive electrode having as its active material an amorphous solid fluorinated carbon represented by the Formula $(CF_x)_n$, wherein $x$ is in the range of from greater than 0 to 1.

3. A battery according to claim 2 wherein said amorphous fluorinated carbon is selected from the group consisting of coke, acetylene black, carbon black, active carbon, charcoal and vegetable active carbon.

4. A battery according to claim 2 wherein said positive electrode comprises a pressure molded amorphous solid fluorinated carbon.

5. A battery according to claim 4 wherein said positive electrode additionally comprises a binder mixed with said amorphous carbon.

6. A battery according to claim 5 wherein said positive electrode further comprises an electrically conducting agent mixed with said amorphous carbon and binder mixture.

References Cited

UNITED STATES PATENTS

| | | | |
|---|---|---|---|
| 3,415,687 | 12/1968 | Methlie | 136—100 R |
| 3,424,621 | 1/1969 | Rogers | 136—100 R |

ANTHONY SKAPARS, Primary Examiner

U.S. Cl. X.R.

136—83 R, 100 R

PO-1050
(5/69)

UNITED STATES PATENT OFFICE
CERTIFICATE OF CORRECTION

Patent No. 3,700,502            Dated October 24, 1972

Inventor(s) Nobuatsu WATANABE and Masataro FUKUDA

It is certified that error appears in the above-identified patent and that said Letters Patent are hereby corrected as shown below:

IN THE HEADING, THE NAME OF THE SECOND INVENTOR
      SHOULD BE

Masataro FUKUDA    not Masataro FUKODA

Signed and sealed this 26th day of June 1973.

(SEAL)
Attest:

EDWARD M. FLETCHER, JR.                 ROBERT GOTTSCHALK
Attesting Officer                          Commissioner of Patents